US009608882B1

(12) United States Patent
Fugate et al.

(10) Patent No.: US 9,608,882 B1
(45) Date of Patent: Mar. 28, 2017

(54) NETWORK EVENT TRACKING

(71) Applicant: Sprint Communications Company L.P., Overland Park, KS (US)

(72) Inventors: Brittany Louise Fugate, Lenexa, KS (US); Andrew Joseph D'Arata, Overland Park, KS (US); Jorge R. Prendes, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/034,755

(22) Filed: Sep. 24, 2013

Related U.S. Application Data

(63) Continuation of application No. 11/677,934, filed on Feb. 22, 2007, now Pat. No. 8,588,078.

(51) Int. Cl.
H04L 12/26 (2006.01)
H04L 12/24 (2006.01)

(52) U.S. Cl.
CPC .......... *H04L 43/08* (2013.01); *H04L 41/0253* (2013.01); *H04L 41/20* (2013.01); *H04L 41/5074* (2013.01)

(58) Field of Classification Search
None
See application file for complete search history.

(56) References Cited

U.S. PATENT DOCUMENTS

| 6,260,048 B1 | 7/2001 | Carpenter et al. |
| 6,606,657 B1 * | 8/2003 | Zilberstein et al. .......... 709/224 |
| 6,774,786 B1 | 8/2004 | Havekost et al. |
| 7,493,518 B2 | 2/2009 | Anderson et al. |
| 2004/0039799 A1 | 2/2004 | Claiborne |
| 2004/0128583 A1 | 7/2004 | Iulo et al. |
| 2007/0288800 A1 | 12/2007 | Chavez et al. |
| 2008/0098109 A1 * | 4/2008 | Faihe et al. ................... 709/224 |
| 2008/0228692 A1 * | 9/2008 | Wannemacher et al. ......... 707/1 |

OTHER PUBLICATIONS

The Track-IT Administrator's Guide, Numara Software, Jun. 22, 2006, pp. 1-10, 50-250, 450-500 and 528.*
S. Willoughby, Generating Reports with REQADM 1.2, as archived by The internet Archive, www.archive.org, on Jan. 17, 2003, pp. 1-126.*

(Continued)

*Primary Examiner* — Christopher Crutchfield

(57) ABSTRACT

A method and system for tracking network events are provided. A network event tracking system includes a network event database, multiple disparate networks, and a report generator. The network event database stores network event data and network element data associated with the multiple disparate networks. A vendor corresponding to each network element supplements the network element data stored in the network event database with vendor data when the network element is operating in a specified condition. The report generator utilizes the network event database to provide snapshots of network health during specified periods based on the network events associated with the network elements. Also, the report generator provides definitions for network acronyms and contact information for network sites associated with network elements.

21 Claims, 20 Drawing Sheets

(56) References Cited

OTHER PUBLICATIONS

The Track-IT Administrator's Guide, Numara Software, Jun. 22, 2006, pp. 1-10, 50-250, 450-500, 524 and 528.*
Non Final Rejection, mailed Mar. 26, 2013, in U.S. Appl. No. 11/677,934.
Advisory Action, mailed Sep. 14, 2012, in U.S. Appl. No. 11/677,934.
Final Rejection; mailed Jun. 14, 2012, in U.S. Appl. No. 11/677,934.
S. Willoughby, Generating Reports with REGADM 1.2, as archived by the Internet Achive, www.archive.org, on Jan. 17, 2003, pp. 1-126.
Author Unknown, Public Interest Network Services Inc. and Public Interest Telecom Inc.: Public Interest Service Level Agreement, pp. 2-3, as retrieved Jun. 16, 2006 from the internet archive, www.archive.org.
Author unknown. Date Formula and Sorting the Group: Dec. 24, 2003. pp. 1-2.
S. Berkun, How to Build a Better Web Browser, pp. 1-9, Dec. 2004.
Non Final Rejection, mailed Aug. 31, 2011, in U.S. Appl. No. 11/677,934.
The Track-IT Administrator's Guide: Numara Software: Jun. 22, 2006: pp. 1-10. 50-250, 450-500 and 528.
Author Unknown, Siemens Heip Desk User's Guide, Jan. 3, 2006, pp. 1-45.
Author Unknown, Magic Service Desk 8.0 User's Guide, 5MG Software, Nov. 2004, pp. 1-25,49-149.
J Vincent R. Spier, D. Rotsky, O. Chamberiain, R. Fotey, RT Essentials, O'Reilly Media, Aug. 16, 2005, pp. 1-15.
Author Unknown, The BMC Remedy Service Desk: Incident Management 7.0, pp. 1-198, Jun. 2006.
Non Final Rejection. mailed Mar. 18, 2011, in U.S. Appl. No. 11/677,934.
Non Final Rejection, mailed Oct. 4, 2010, in U.S. Appl. No. 11/677,934.
Advisor Action, mailed May 10, 2010, in U.S. Appl. No. 11/677,934.
Final Rejection, mailed Feb. 26, 2010, in U.S. Appl. No. 11/677,934.
The DMTF Solution Exchange and Service incident Specification. The Distributed Management Task Force, Draft DSP0132, Feb. 23, 2000, pp. 1-14.
Non Final Rejection, mailed Aug. 19, 2009, in U.S. Appl. No. 11/677,934.
Autotask Corporation Web site "Autotask: IT Services Management Software." Available at http://itservices.autotask.com/schedule_and_dispatch_your_field_service_tech.htm. <Retrieved on Dec. 4, 2006>.
K12USA.com Web site. "TroubleTrakkerPRO." Available at: http://www.ki2usa.com/trakkerpro.asp. <Retrieved on Dec. 4, 2006>.
NetResults Corporation Web site. "Problem Tracker." Available at: http://www.problemtracker.com/. <Retrieved on Dec. 4, 2006>.

* cited by examiner

NETWORK EVENT TRACKING SYSTEM [SEARCH]

HOME | NEW BRIEF ENTRY | NEW INFO ENTRY | ADVANCED SEARCH | IP OPS LINKS | CLOSED ITEMS | LONGTERM HANDOFF ITEMS | GLOSSARY SEARCH | SITNET SEARCH | DASHBOARD | USERS | LOGOUT

COMMON LINKS | CISCO™ LINKS | SONET SPECIFIC LINKS | INFORMATIONAL | SITE LISTING | SPRINT™ LINKS

USER MANAGEMENT

ADD NEW USER — 210
- NAME
- EMAIL
- USERNAME
- PASSWORD
- IP GROUP: CORE
- LEVEL: TECH

[SAVE NEW USER]

CURRENT USERS

| NAME | USERNAME | PASSWORD | IP GROUP | LEVEL | | |
|------|----------|----------|----------|-------|------|--------|
| JOE DOE | JOE123 | AW******** | CORE | TECH | EDIT | DELETE |
| MIKE WRIGT | MADMAX | QT******** | BSO | ADMIN | EDIT | DELETE |

NETWORK EVENT TRACKING SYSTEM [SEARCH]

HOME | NEW BRIEF ENTRY | NEW INFO ENTRY | ADVANCED SEARCH | IP OPS LINKS | CLOSED ITEMS | LONGTERM HANDOFF ITEMS | GLOSSARY SEARCH | SITNET SEARCH | DASHBOARD | USERS | LOGOUT

COMMON LINKS | CISCO™ LINKS | SONET SPECIFIC LINKS | INFORMATIONAL | SITE LISTING | SPRINT™ LINKS

NEW BRIEF ENTRY

- EVENT NUMBER: 510
- ELEMENT NAME: 520
- ELEMENT 2 NAME: 530
- ENTERED BY: 540 — BRITTANY FUGATE
- RESPONSIBLE: 550 — CORE
- ASSIGNED TO: 560 — BRITTANY FUGATE
- ORIGINAL PROBLEM DESCRIPTION: 570
- PLAN OF ACTION: 580
- NETWORK: 590 — CORE
- CISCO™ CASE: 591
- MAINTENANCE SEQUENCE: 592
- SEVERITY: 593 — 1○ 2○ 3○ 4○ 5○
- LONGTERM HANDOFF ITEM?: 594 — ☐

[SUBMIT]

NETWORK EVENT TRACKING SYSTEM [SEARCH]

HOME | NEW BRIEF ENTRY | NEW INFO ENTRY | ADVANCED SEARCH | IP OPS LINKS | CLOSED ITEMS | LONGTERM HANDOFF ITEMS | GLOSSARY SEARCH | SITNET SEARCH | DASHBOARD | USERS | LOGOUT

COMMON LINKS | CISCO™ LINKS | SONET SPECIFIC LINKS | INFORMATIONAL | SITE LISTING | SPRINT™ LINKS

ADVANCED SEARCH – REPORT GENERATOR

EVENT NUMBER: 710

720 — CISCO™ CASE:

MAINTENANCE SEQUENCE: 730

740 — ELEMENT NAME:
(SEARCHES BOTH ELEMENT AND ELEMENT 2 FIELDS)

750 — ENTERED BY:

DESCRIPTION: 760

770 — PLAN OF ACTION:

RESPONSIBLE: 780

SEVERITY: 790          1 ○  2 ○  3 ○  4 ○  5 ○

SPECIFY TIME PERIOD: 791

○ TODAY
○ YESTERDAY
○ THIS WEEK
○ LAST WEEK
○ THIS MONTH
○ LAST CALENDAR MONTH
○ FROM [JAN ▼] [01 ▼] [2006 ▼] TO [JAN ▼] [01 ▼] [2006 ▼]

[RUN REPORT]

NETWORK EVENT TRACKING SYSTEM [    ] [SEARCH]

HOME | NEW BRIEF ENTRY | NEW INFO ENTRY | ADVANCED SEARCH | IP OPS LINKS | CLOSED ITEMS | LONGTERM HANDOFF ITEMS | GLOSSARY SEARCH | SITNET SEARCH | DASHBOARD | USERS | LOGOUT
COMMON LINKS | CISCO™ LINKS | SONET SPECIFIC LINKS | INFORMATIONAL | SITE LISTING | SPRINT ™ LINKS

SITNET SEARCH

[ 150 ]    [SUBMIT QUERY]

| SITENAME | NUMBER | CLI | COST CENTER | ADDRESS | OWNER | HOURS | SUPERVISOR | TYPE | NESTS | BAY | CONTACT | PHONE | POWER SUPPLY | NOTES |
|---|---|---|---|---|---|---|---|---|---|---|---|---|---|---|
| OMAHA | 75 | OMA | N/A | 810 7TH ST. | SWOPS | 18X5 | STEVE | LINK2 | 3 | 1501 | SITE TECH | 555-1121 | DC PIONEER | |
| ST PAUL | 75 | STP | N/A | 201 6TH AVE. | SWOPS | 18X5 | SALLY | LINK2 | 3 | 1501 | SITE TECH | 555-1221 | DC PIONEER | |

NETWORK EVENT TRACKING SYSTEM — 1300

HOME | NEW BRIEF ENTRY | NEW INFO ENTRY | ADVANCED SEARCH | IP OPS LINKS | CLOSED ITEMS | LONGTERM HANDOFF ITEMS | GLOSSARY SEARCH | SITNET SEARCH | DASHBOARD | USERS | LOGOUT

COMMON LINKS | CISCO™ LINKS | SONET SPECIFIC LINKS | INFORMATIONAL | SITE LISTING | SPRINT™ LINKS

| CORE | OSSNET | SITNET | ALL BRIEF ENTRIES | INFORMATIONAL | IP OPS WHITEBOARD | LONGTERM HANDOFF |
|---|---|---|---|---|---|---|

INFORMATION BROADCAST

CLOSED MAINTENANCES – LAST 24 HOURS

| PRIORITY | DATE ENTERED | DESCRIPTION | ENTERED BY | |
|---|---|---|---|---|
| N/A | 10/27/2006 5:00 PM | CSR1 ROUTER IN CHICAGO NO TRAFFIC | PATRICK DARLING | CLOSE \| ADD NEW INFO |
| N/A | 10/21/2006 1:00 PM | NEED VENDOR CONTACT NUMBER | STEVE SWANK | CLOSE \| ADD NEW INFO |

NETWORK EVENT TRACKING SYSTEM [ SEARCH ]

| HOME | NEW BRIEF ENTRY | NEW INFO ENTRY | ADVANCED SEARCH | IP OPS LINKS | CLOSED ITEMS | LONGTERM HANDOFF ITEMS | GLOSSARY SEARCH | SITNET SEARCH | DASHBOARD | USERS | LOGOUT |

1410  1420

COMMON LINKS | CISCO™ LINKS | SONET SPECIFIC LINKS | INFORMATIONAL | SITE LISTING | SPRINT™ LINKS

| CORE | OSSNET | SITNET | ALL BRIEF ENTRIES | INFORMATIONAL | IP OPS WHITEBOARD | LONGTERM HANDOFF |

CORE ENTRIES   1430

1440

SHOW ALL | HIDE ALL | PRINT SCREEN

| INFO | SEVERITY | NETWORK | EVENT | ELEMENT | ELEMENT2 | ENTERED | UPDATED | CISCO™ CASE | MAINTENANCE | ASSIGNED |
|---|---|---|---|---|---|---|---|---|---|---|
| CISCO™ CASE | 3 | CORE | 1181113 | PIP ROUTER | 6046224465 | 10/10/06 1:00 PM | 10/10/06 1:00 PM | 886000 | N/A | DAVE WARNER |

DESCRIPTION: (SHOW | HIDE) : MULTIPLE PIP ROUTERS ISOLATED. CHECK WITH VENDOR. CHECK FOR UPDATES

1451                                                NEW POA | ADD COMMENTS | VIEW HISTORY | EDIT | CLOSE

| CISCO™ CASE | 6 | CORE | 1281413 | PIP-NOC-1 | | 10/20/06 4:00 PM | 10/23/06 1:00 AM | 886300 | N/A | LINDA NELSON |

MAINTENANCE

DESCRIPTION: (SHOW | HIDE) : CONNECTION UNSTABLE. ISOLATED PROBLEM    1460  1461  1462

1452                                                NEW POA | ADD COMMENTS | VIEW HISTORY | EDIT | CLOSE

| | 4 | CORE | 2281413 | PIP-NOC-2 | | 10/20/06 4:10 PM | 10/23/06 3:00 AM | 886400 | N/A | LINDA NELSON |

DESCRIPTION: (SHOW | HIDE) : REPEATEDLY RESETTING. IMPACTS OTHER NETWORK ELEMENTS

NEW POA | ADD COMMENTS | VIEW HISTORY | EDIT | CLOSE

FIG. 14

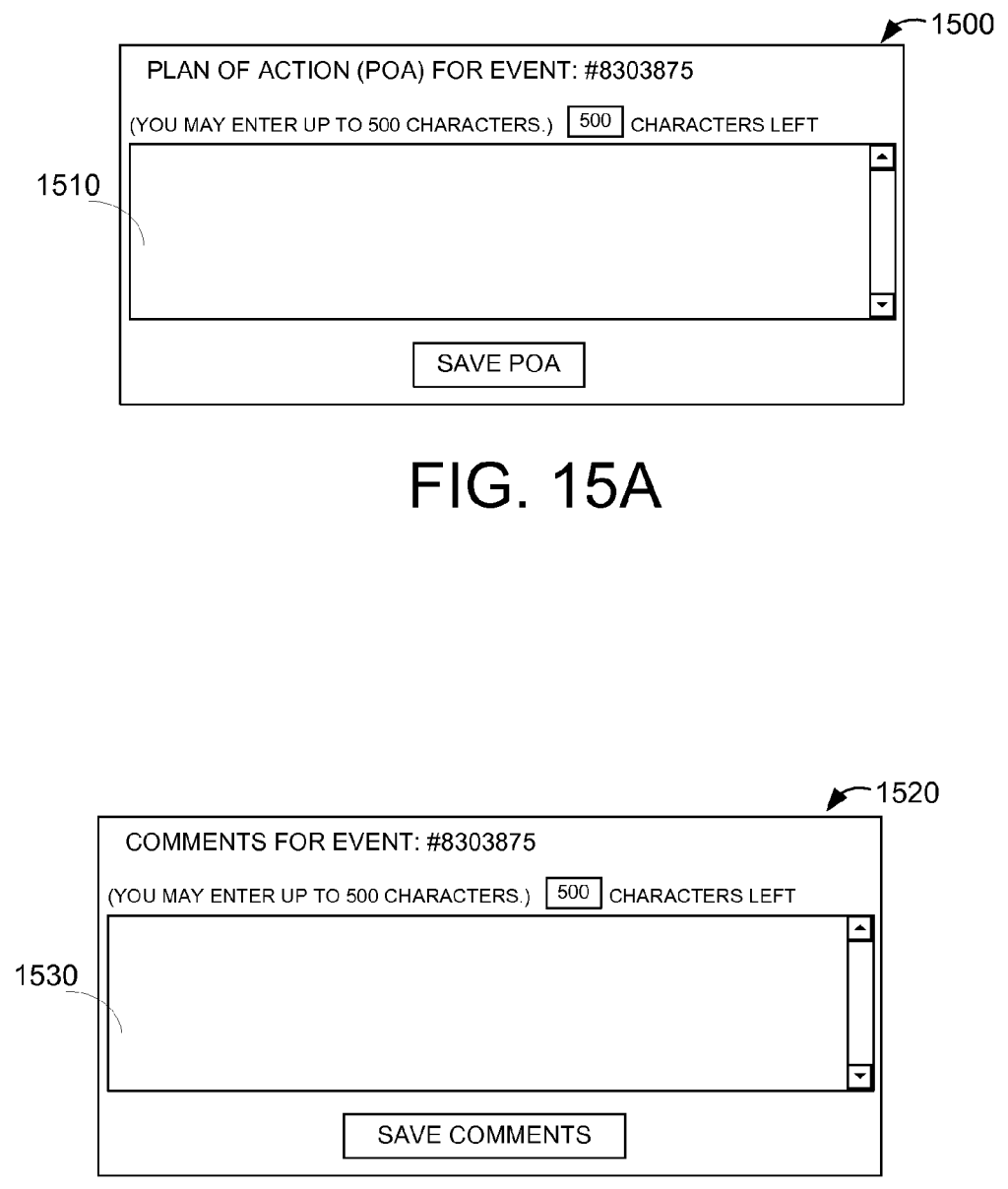

```
                                                        ← 1500
┌─────────────────────────────────────────────────┐
│  PLAN OF ACTION (POA) FOR EVENT: #8303875       │
│                                                 │
│  (YOU MAY ENTER UP TO 500 CHARACTERS.) [500] CHARACTERS LEFT │
│         ┌─────────────────────────────────┐▲    │
│ 1510    │                                 │     │
│         │                                 │     │
│         │                                 │     │
│         └─────────────────────────────────┘▼    │
│                                                 │
│              ┌──────────────┐                   │
│              │  SAVE POA    │                   │
│              └──────────────┘                   │
└─────────────────────────────────────────────────┘
```

FIG. 15A

```
                                                        ← 1520
┌─────────────────────────────────────────────────┐
│  COMMENTS FOR EVENT: #8303875                   │
│                                                 │
│  (YOU MAY ENTER UP TO 500 CHARACTERS.) [500] CHARACTERS LEFT │
│         ┌─────────────────────────────────┐▲    │
│ 1530    │                                 │     │
│         │                                 │     │
│         │                                 │     │
│         └─────────────────────────────────┘▼    │
│                                                 │
│              ┌──────────────────┐               │
│              │  SAVE COMMENTS   │               │
│              └──────────────────┘               │
└─────────────────────────────────────────────────┘
```

FIG. 15B

NETWORK EVENT TRACKING

PRIORITY

This application is a continuation of U.S. patent application Ser. No. 11/677,934, filed Feb. 22, 2007, which is hereby incorporated by reference in its entirety.

BACKGROUND

Conventionally, network problems and solutions are managed by ticket-management systems. The ticket-management systems define problems experienced by network users. In turn, network technicians are assigned the problems. The network technicians utilize the ticket management system to determine whether solutions to the problems are stored in a solutions knowledgebase. If solutions to the problems are stored in the solutions knowledgebase, the technicians present the network users with the solutions found in the solutions knowledgebase. However, if the solutions knowledgebase does not have solutions to the problems, the network technicians must generate tailor-made solutions to the problems experienced by the network users.

A large-scale network having disparate network infrastructures generates a large collection of problems that require tailor-made solutions. A group of network technicians that attempts to solve the large collection of problems may work during different shifts. The group of network technicians may be divided into a day shift and a night shift. Thus, tailor-made solutions for the large collection of problems may be worked during a day shift and a night shift.

Because the number of network infrastructures that a network technician monitors and manages and the number of unsolved problems increases in the large-scale network, managing the unsolved problems across multiple shifts becomes necessary when network problems effect critical systems of the network infrastructure. Current ticket tracking systems do not effectively store and communicate network problem status and solution status, associated with network elements in the network infrastructure, across multiple shifts.

SUMMARY

The present invention is defined by the claims below. Embodiments of the present invention solve at least the above problems by providing a system and method for, among other things, tracking network events in a large-scale communication network. The present invention has several practical applications in the technical arts including, but not limited to, communicating network event to clients across different shifts, and generating network reports that include, but are not limited to, definitions for network acronyms, snap shots of open and closed network events during a specified time period, and network events associated with each of the multiple network.

In a first aspect, a method to track network events includes receiving network event data for network elements in the large-scale network from a client. The network event data and corresponding network element data is stored in a database. Vendor data corresponding to the network element data is retrieved from a vendor of the network element at the uniform resource locator of the vendor. The network element and network event is tracked based on the network event data and network element data included in the database and the vendor data provided by the vendor of the network element.

In a second aspect, a method to generate network event reports includes receiving a query having network related data. The query is processed to search on a network event database for entries that match the query. In response, to the query a webpage having a network event report is generated and displayed to a authorized client. The network event report may include, among other things, entries that match query, definitions for network acronyms, statistics associated with the network element and network events, and trend information across disparate network included in the large-scale network.

In a third aspect, a network tracking system includes a large-scale network having multiple disparate communication networks. The multiple communication networks include various network elements. Also, the network tracking system includes a centralized database that stores network events associated with the network elements in the multiple communication networks. The tracking system utilizes a report generator component and information broadcast component that provides pertinent network data to authorized clients.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 2 is a user interface diagram illustrating an exemplary user management interface for network event tracking system, according to embodiments of the present invention;

FIG. 5 is a user interface diagram illustrating an exemplary event collection interface for the network event tracking system, according to embodiments of the present invention;

FIG. 7 is a user interface diagram illustrating an exemplary advanced search interface for the network event tracking system, according to embodiments of the present invention;

FIG. 8 is a user interface diagram illustrating an exemplary closed items search interface for the network event tracking system, according to embodiments of the present invention;

FIG. 10 is a user interface diagram illustrating an exemplary network site search interface for the network event tracking system, according to embodiments of the present invention;

FIG. 13 is a user interface diagram illustrating an exemplary user broadcast interface for the network event tracking system, according to embodiments of the present invention;

FIG. 14 is a user interface diagram illustrating an exemplary network event interface for the network event tracking system, according to embodiments of the present invention;

FIG. 15A is a user interface diagram illustrating an exemplary plan of action interface for the network event tracking system, according to embodiments of the present invention;

FIG. 15B is a user interface diagram illustrating an exemplary comment interface for the network event tracking system, according to embodiments of the present invention;

DETAILED DESCRIPTION

Embodiments of the present invention provide, among other things, systems and methods for tracking network events. A network event tracking system (NETS) provides a graphical user interface that clients may utilize to enter network event data associated with a large-scale network having multiple networks into a network event database. NETS provides network-specific applications that a client may utilize to manage and maintain the network elements associated with network events in each of the multiple networks. Among the network-specific applications, NETS provides a reporting mechanism that utilizes search terms and criteria to communicate network problem status and solution status across shifts having multiple authorized clients.

ACRONYMS AND SHORTHAND NOTATIONS

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| NETS | Network Event Tracking System |
| SONET | Synchrounous Optical Network |
| URL | Uniform Resource Locator |

As utilized herein, the term "component" refers to any combination of hardware, firmware, and software. Moreover, computer-readable media may include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

A network event tracking system interfaces with many disparate communication networks having network elements, such as personal computers, switches, and routers. Each of the disparate communication networks provides event related data to the network event tracking system. The network event related data is stored in a database that is processed by the network event tracking system to generate reports and interfaces corresponding to network events occurring on different networks. The network event tracking system provides reports to inform a client or technician about the health of the disparate communication networks.

Figure 1:
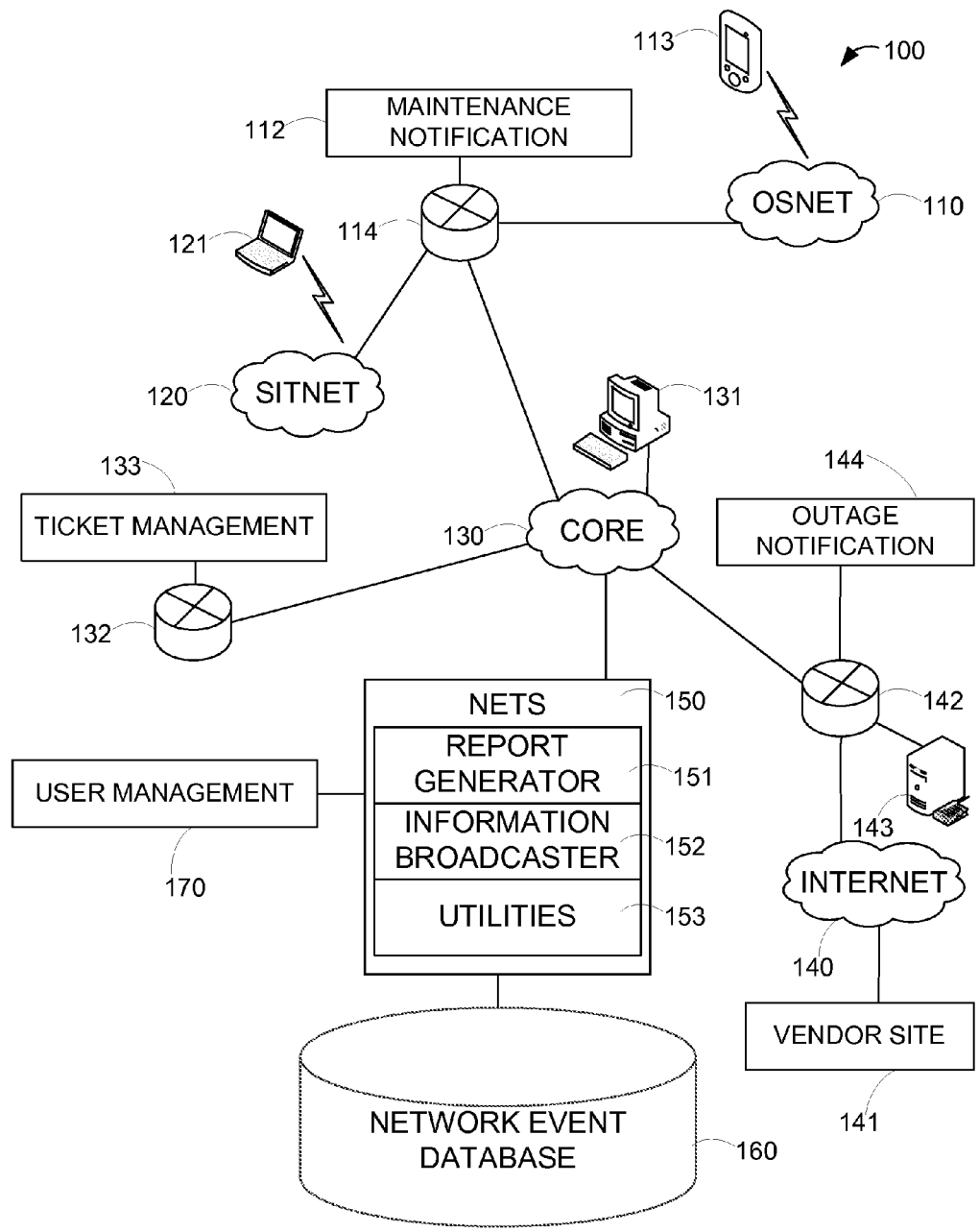
FIG. 1 is a network diagram illustrating an exemplary operating environment for a network event tracking system, according to embodiments of the present invention.

FIG. 1 is a network diagram illustrating an exemplary operating environment 100 for a network event tracking system (NETS) 150, according to embodiments of the present invention. One of ordinary skill in the art appreciates and understands that operating environment has been simplified. Further, embodiment of the present invention may interface with numerous other operating environments.

The operating environment 100 may include multiple communication networks 110, 120, 130, and 140, routers 114, 142, and 132, client devices 113, 121, 131, server devices 143, maintenance notification systems 112, ticket-management systems 133, user management systems 170, outage notification systems 144, vendor sites 141, NETS 150, and network event databases 160.

The multiple communication networks 110, 120, 130, and 140 connect network elements and enable communication between the network elements. The communication networks may include a segment of the Internet 140 and other support networks 110, 120, and 130. Each network 110, 120, 130, and 140 may provide event data to the NETS 150 when a specified condition exists in the network. Technicians monitoring the networks 110, 120, 130, and 140 may also provide event data to the NETS 150.

The routers 114, 132, and 142 are utilized to connect network elements and enable communication across the networks 110, 120, 130, and 140. The routers may enable client devices 112, 113, and 121 to communicate with each other and other network elements. The routers 114, 132, and 142 connect maintenance notification systems 112, ticket-management systems 133, and outage notification systems 144 to NETS 150.

The client devices 112, 113, and 121 may include laptops, personal digital assistants, and personal computers. The client devices 112, 113, and 121 may connect to the routers 114, 132, and 142 and communicate with NETS 150. The client devices 112, 113, and 121 may communicate with the routers 114, 132, and 142 over a wireless interface, such as IEEE 802.11. In some embodiments, the client devices 112, 113, and 121 may communicate with the routers 114, 132, and 142 over a wired interface, such as IEEE 802.3.

The server devices 143 may provide address translation services for NETS 150, routers 114, 132, and 142, client devices 112, 113, and 121, maintenance notification systems 112, ticket-management systems 133, or outage notification systems 144. The server devices 143 connect to router 142 and may communicate the address translation for a location on the Internet 140 to NET 150. Subsequently, NETS 150 may utilize the address translation to access the location.

The maintenance notification systems 112 may provide maintenance updates to the client devices 112, 113, and 121 or NETS 150. The maintenance updates may inform the NETS 150 that a scheduled task on one or more of networks 110, 120, 130, or 140 was completed. The maintenance update may also information the NETS 150 that additional maintenance is required for the one or more networks 110, 120, 130, or 140.

The ticket-management systems 133 may provide ticket information for problems reported in the operating environment 100. The ticket management system 133 communicates the ticket information to the client devices 112, 113, and 121 or NETS 150. The NETS 150 may receive ticket information and correlate the ticket information one or more network event stored in the network event database 160.

The outage notification systems 144 may provide notifications to the client devices 112, 113, and 121 or NETS 150 when any network element in the operating environment 100 is removed from the network, turned off, or lost power. The notifications may be communicated to the NETS as periodic updates or as a batch update. The NETS 150 may receive the notifications to update entries associated with one or more network elements impacted by the outage and to store the updated entries in the network event database 150

The vendor sites 141 provide vendor data and additional support for network elements maintained by the vendor. The vendor site 141 is utilized by NETS 150 or client devices 113, 121, and 131 to extract vendor data associated with a network element that is being repaired due to a malfunction. The vendor site 141 may provide a vendor case number associated with the malfunction. Also, the vendor site 141 may also provide a status for parts that are required to fix the network element.

The NETS 150 communicates with maintenance notification systems 112, ticket management system 133, outage notification system 144, and vendor sites 141 to retrieve maintenance updates, outage information, ticket information, and vendor data related to a network event. The NETS 150 may store network event data and related data retrieved from the maintenance notification systems 112, ticket management system 133, outage notification system 144, and vendor sites 141 in network event database 160. The NETS 150 include a report generator 151, an information broadcaster 152, and utilities 153. The report generator 151 may query the network event database 160 to generate reports that provide information about the networks health, maintenance related data, and network trends. The information broadcaster 152 informs a user or technician of management updates that affect how network element are monitored or maintained. The utilities 153 of the NETS 150 may include links or programs that further aid a technician in diagnosing a network event and developing corrective action for the network event if needed.

The user management systems 170 may provide security for the NETS 150. An administrator of the NETS 140 may interface with the user management system 170 to generate additional users having varying levels of rights. The user management system 170 may be utilized to modify credential information, such as name, user name and password associated with the users in the user management system 170. In some embodiments, access to the network event database 160 having an event data may be limited only to individuals authorized based on the security provisions included in the NETS 150.

The network event database 160 stores network event data retrieved from the multiple communication networks 110, 120, 130, and 140. The network event database 160 may respond to queries presented by the NETS 150. The network event database 160 may store network event data that describes a network event provided by one or more of the maintenance notification systems 112, ticket-management systems 133, outage notification systems 144 or vendor sites 141. Also, the network event database 160 may store plans for completing or correcting the network events stored in the network event database 160.

The foregoing description of the operating environment was illustrative and was not intended to limit the scope of the claimed invention.

Figure 3:
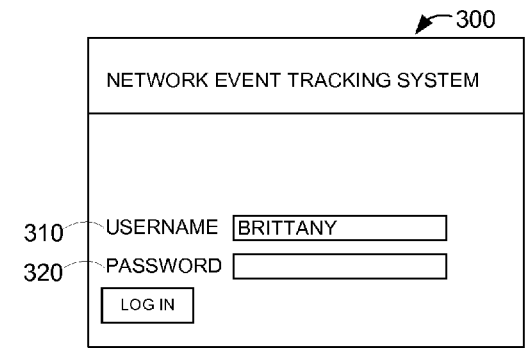
FIG. 3 is a user interface diagram illustrating an exemplary login interface for the network event tracking system, according to embodiments of the present invention.

Access to the NETS is protected by a user management system. Users having a an appropriate level of authority are provided with access to the network event database. Unauthorized access to the network event database is denied when the client lacks the appropriate credentials. FIGS. 2-3 provide interfaces that limit access to the network events stored in the network event database.

FIG. 2 is a user interface diagram illustrating an exemplary user management interface 200 for a network event tracking system, according to embodiments of the present invention. The user management interface 200 may include an add new user section 210 and a current user section 220. The add new user section 210 includes fields that are utilized to gather personal information for a new user. After the personal information is collected from the new user, the new user information may be submitted and stored to allow subsequent access to the database. The current user section 220 provides a listing of all the current user of the network event track system.

FIG. 3 is a user interface diagram illustrating an exemplary login interface 300 for the network event tracking system, according to embodiments of the present invention. The login interface includes a username textbox 310 and a password textbox 320. A technician or user attempting to gain access to NETS must provide a user name 310 and password 320. The user or technician having the appropriate username and password is authorized to access the NETS. Otherwise, the user or technician is unauthorized and access to NETS is denied.

Figure 4:
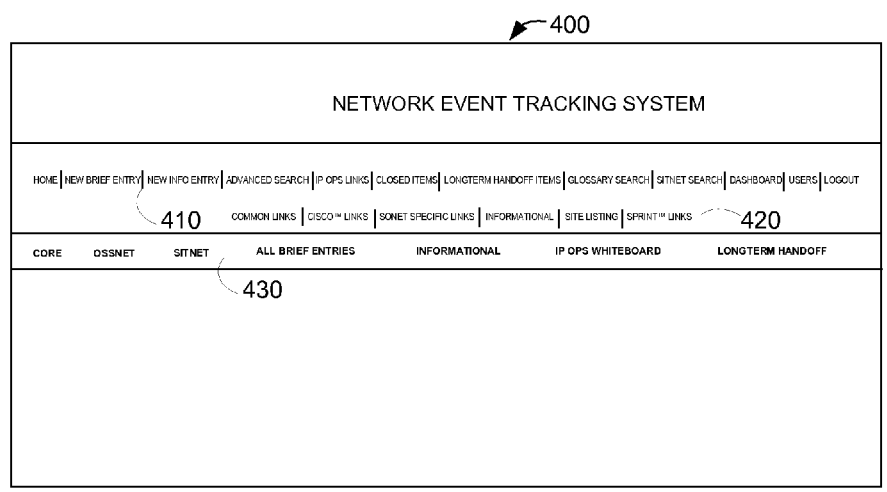
FIG. 4 is a user interface diagram illustrating an exemplary navigation toolbar for the network event tracking system, according to embodiments of the present invention.

Navigating between report interfaces and event entry interfaces NETS is enabled by a navigation toolbar. The navigation toolbar for navigating NETS may also include links to data that further define network events and shortcuts to standard reports that provide event information that is of interest to a client or technician. FIG. 4 is a user interface diagram illustrating an exemplary navigation toolbar 400 for the network event tracking system (NETS), according to embodiments of the present invention. The navigation toolbar 400 may include an update and search section 410, a utilities section 420, and a shortcut section 440. The update and search section 410 provides the ability to navigate to interfaces for updating and searching the network event data stored in the network event database. The utilities section 420 provides the ability to navigate to interfaces that provide programs or uniform resource locators (URL) for retrieving additional information that may be utilized to perform a monitoring or maintenance tasks associated with a network event. The shortcut section 430 provides the ability to navigate to frequently accessed interfaces. The frequently accessed interfaces may include network-specific reports that provide network events for frequently accessed networks. Accordingly, the navigation toolbar 400 may be utilized to move among the many interfaces provided by NETS.

The network event database receives new network event data from data provided in an event collection interface. The event collection interface collection receives network event data from a user or technician. In turn, the network event data is stored in the network event database.

FIG. 5 is a user interface diagram illustrating an exemplary event collection interface 500 for the network event tracking system (NETS), according to embodiments of the present invention. The event collection interface 500 provides user interface elements that gather network event data and data related to the network elements that are impacted by a network event. For each network event, the event collection interface 500 receives network event data from any combination of an event number textbox 510, element name textbox 520, element 2 name textbox 530, entered by textbox 540, responsible dropdown menu 550, assigned to dropdown menu 560, problem description textbox 570, plan of action textbox 580, network dropdown menu 590, Cisco™ case textbox 591, maintenance sequence textbox 592, severity option element 593, and long-term handoff checkbox 594. The event number 510 textbox receives an identifier utilized to identify the network event. The element name 520 and element 2 name 530 textbox receive identifiers that are utilized to identify the interfaces impacted by the network event. The entered by 540 text box receives the name of the user or technician that enters the network event data and network element data into the event collection interface 500. The responsible dropdown menu 550 enable selection of a network that leads when addressing the network event. The assigned dropdown menu 560 enables selection of a qualified technician that will be available to perform tasks associated with the network event. The problem description summary textbox 570 receives information that describes one or problems associated with the network event. The plan of action textbox 580 receives a description of actions that should be taken by the technician or client when addressing the network event. The network dropdown menu 590 enables selection of a network where the network event was first noticed. The Cisco™ case number textbox receives a case number provided by Cisco™ that is associated with a Cisco™ network element that caused the network event. In some embodiment's a case number may be provided any vendor of network elements that also maintains and troubleshoots the network events caused by vendor's network element. The maintenance sequence textbox 592 receives an identifier that is utilizes to refer to maintenance activity associated with network event. The severity option element 593 provide a numerical indication of how much an impact the network event is having on customers. A lower severity means that a large number of customer are impacted, whereas a high severity means that a small number of customer are impacted. In some embodiments, the mapping between severity and customer impacted is reversed. The long-term handoff checkbox 594 indicates whether the network event has been open for a long period of time.

In some embodiments, one or more user interface elements of the event collection interface 500 are automatically populated based on data provided from a user management system, ticket management system, maintenance system, or outage notification system. Accordingly, the network event data and related network element data gathered by the event collection interface 500 are stored in the network event database.

The clients or technician that utilize NETS my determine that information or network events having a specified characteristic should be broadcast to all authorized users of NETS. NETS provides a information broadcast interface that collects data associated with message that needs to be received by the authorized users.

Figure 6:
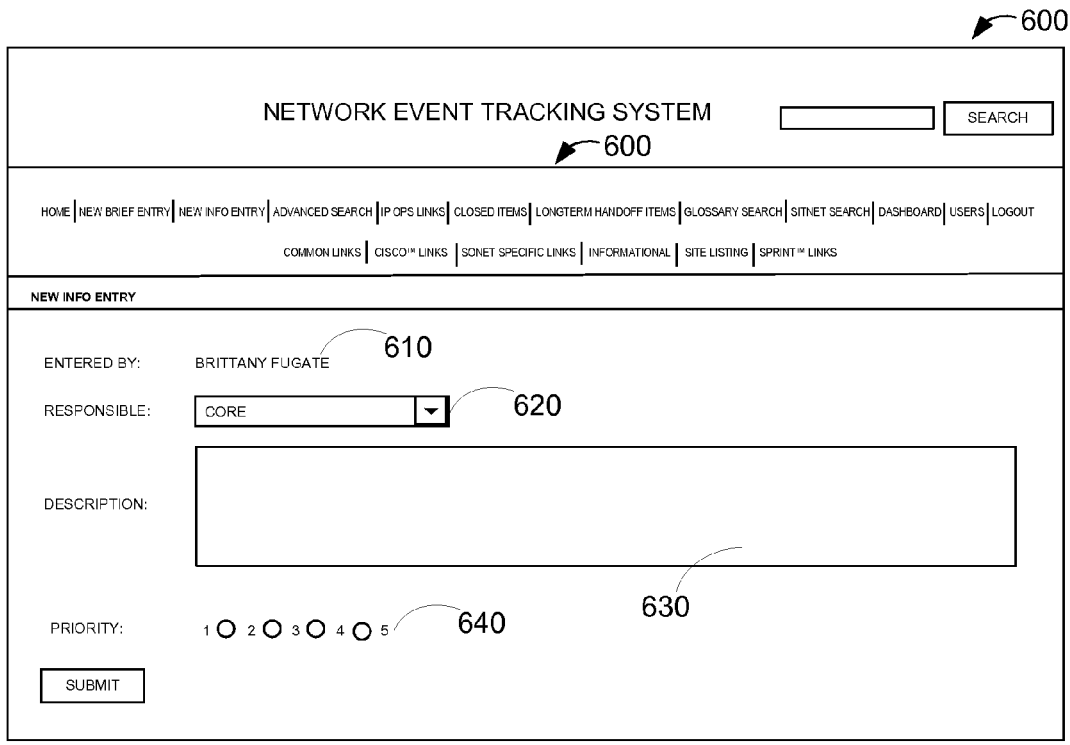
FIG. 6 is a user interface diagram illustrating an exemplary information broadcast collection interface for the network event tracking system, according to embodiments of the present invention.

FIG. 6 is a user interface diagram illustrating an exemplary information broadcast collection interface 600 for the network event tracking system, according to embodiments of the present invention. The information broadcast collection interface 600 includes user interface elements that gather information or network events that are broadcasted to all authorized users. The user interface elements include an entered by text box 610, a responsible drop down menu 620, a description textbox 630 and priority option elements 640. A technician accesses the information broadcast interface 600 to enter a description of the information or network event. The entered by textbox 610 receives the name of the client or technician that generates the broadcast. The responsible dropdown menu 620 provides a list of networks that are selected to indicate which network or networks the broadcast relates impacts. The description textbox 630 receives a summary that describe the network event or information for broadcasting. The priority option element 640 allows the client or technician to specify a priority for the broadcast. The priority may indicates whether the information impacts internal or external customers and client. A low priority broadcast may impact internal network elements, and a high priority broadcast may impact external network elements. The internal network elements may include routers and switches that connect a companies internal operations. The external elements may include routers and switches that connect customers of the company.

In certain embodiments, one or more user interface elements of the information broadcast interface 600 are automatically populated based on data provided from a user management system, ticket management system, maintenance system, or outage notification system. Accordingly, the network event data and related network data gathered by the information broadcast interface 600 are stored in the network event database.

After populating the network database, the NETS may perform standard pre-define queries or user-defined queries to generate reports that present network event data that match the query criteria. NETS may provide an advanced search interface that includes criteria that a client or technician may utilize to search the network event database when generating a network event report.

FIG. 7 is a user interface diagram illustrating an exemplary advanced search interface 700 for the network event tracking system, according to embodiments of the present invention. The advanced search interface 700 includes user interface elements that receive user criteria that are searched in the network event database. The user interface elements include a event number textbox 710, a Cisco™ case number textbox 720, a maintenance sequence textbox 730, an element name textbox 740, an entered by textbox 750, a description textbox 760, a plan of action textbox 770, a responsible textbox 780, a severity option element 790, and a time option element 791. The event number textbox 710 receives a event number as a criteria that are searched for in the network event database. The Cisco™ case number textbox 720 receives a Cisco™ case number as criteria that are searched for in the network event database. The maintenance sequence textbox 730 receives a maintenance sequence number as criteria that are searched for in the network event database. The element name textbox 740 receives an element name associate with one or more interfaces of a network element as criteria that are searched for in the network event database. The entered by textbox 750 receives a client or technician name as criteria that are searched for in the network event database. The description textbox 760 receives a summary of the problem as criteria that are searched for in the network event database. The plan of action textbox 770 receives a description of the actions as criteria that are searched for in the network event database. The responsible textbox 780 receives a name of a network as criteria that are searched for in the network event database. The severity option element 790 receives a severity as criteria that are searched in the network event database. The time option element 791 receives a timer period as criteria that are searched in the network event database. Any number of criteria provided by the client or technician may be utilized to search the network database when generating a network event report.

Figure 8:
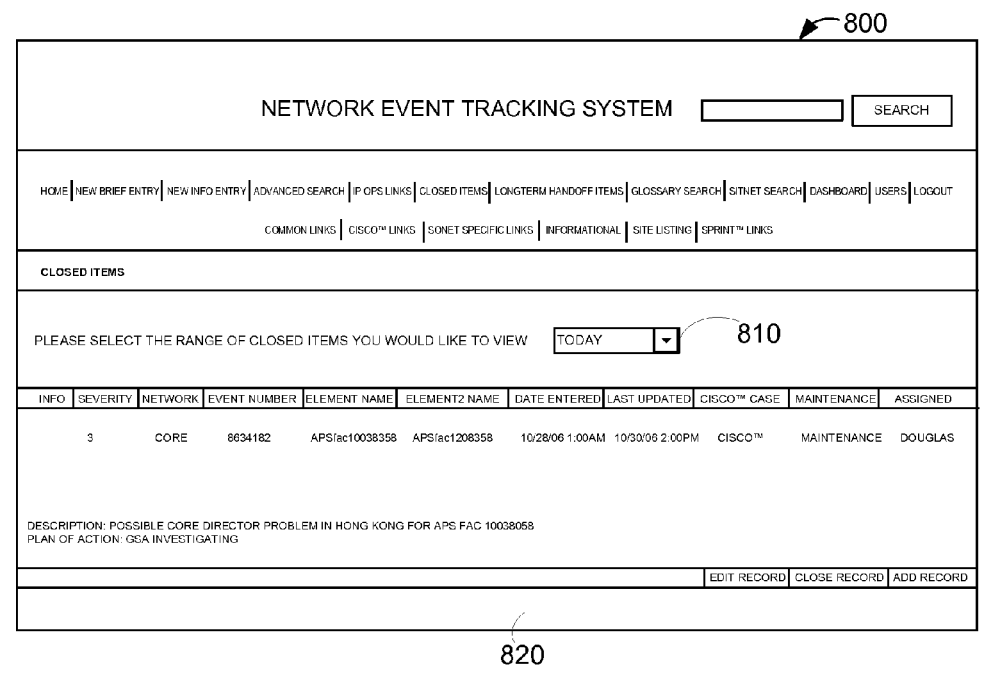
Figure 9:
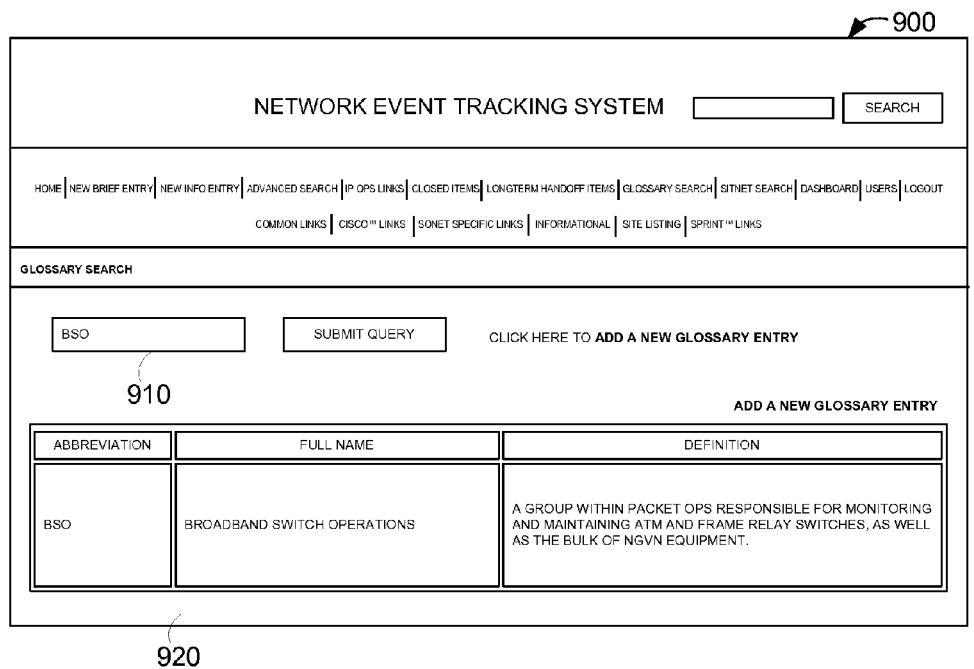
FIG. 9 is a user interface diagram illustrating an exemplary glossary search interface for the network event tracking system, according to embodiments of the present invention.

In addition to the advanced search interface that may be utilized to search all entries in the network event database, NETS provides specialized search interfaces that accesses a entries having a specified condition. For instance, NET may provide a closed items search interface, a glossary search interface, network search interface. The closed items search interface is utilized to access items that a client technician closes. The glossary search interface is utilized to access definitions for acronyms utilized by client or technicians. The network search interface may be utilize to access contact information for each network site included in NETS. FIGS. 8-10 provides an illustration for each of the specialized interfaces.

FIG. 8 is a user interface diagram illustrating an exemplary closed items search interface 800 for the network event tracking system, according to embodiments of the present invention. The closed items search interface 800 access entries that are closed by the client or network technician. An entry in the network event database is flagged as closed when the client performs an action associated with an entry corresponding to a network event. The closed items search interface 800 includes a date dropdown menu 810 that receives a time period as criteria that is utilized to search the closed entries include in the network event database. The closed entries that match the specified time period are presented to the client or technician in a display area 820 of the closed items search interface 800.

FIG. 9 is a user interface diagram illustrating an exemplary glossary search interface 900 for the network event tracking system, according to embodiments of the present invention. The glossary search interface 900 may provide the client or technician with a query textbox 910 that is utilized to receive acronyms that are foreign to the client or technician. The glossary search interface 900 searches a glossary table included in network event database to access a results for the query. The results of the query are presented in a display area 920 of the glossary search interface 900. The results provide a definition of the acronyms or terms that are foreign to the client or technician.

FIG. 10 is a user interface diagram illustrating an exemplary network site search interface 1000 for the network event tracking system, according to embodiments of the present invention. The network site search interface 1000 may provide the client or technician with a query textbox 1010 that is utilized to receive network identifiers or names from the client or technician. In turn, the network identifiers or names are searched in the network event database to located contact information corresponding to the network identifiers or names. The contact information is presented in the display area 1020 of the network site search interface 1000.

The results of the advanced search are provided as a report to the client or technician. The report may provide a listing of network events or network elements that match the criteria provided in the query. Alternatively, NETS may generate a report interface to graphically display the items that match the criteria provided in the advance search. The report interface may selectively present data that matches the criteria or selectively aggregate data that matches the criteria.

Figure 11:
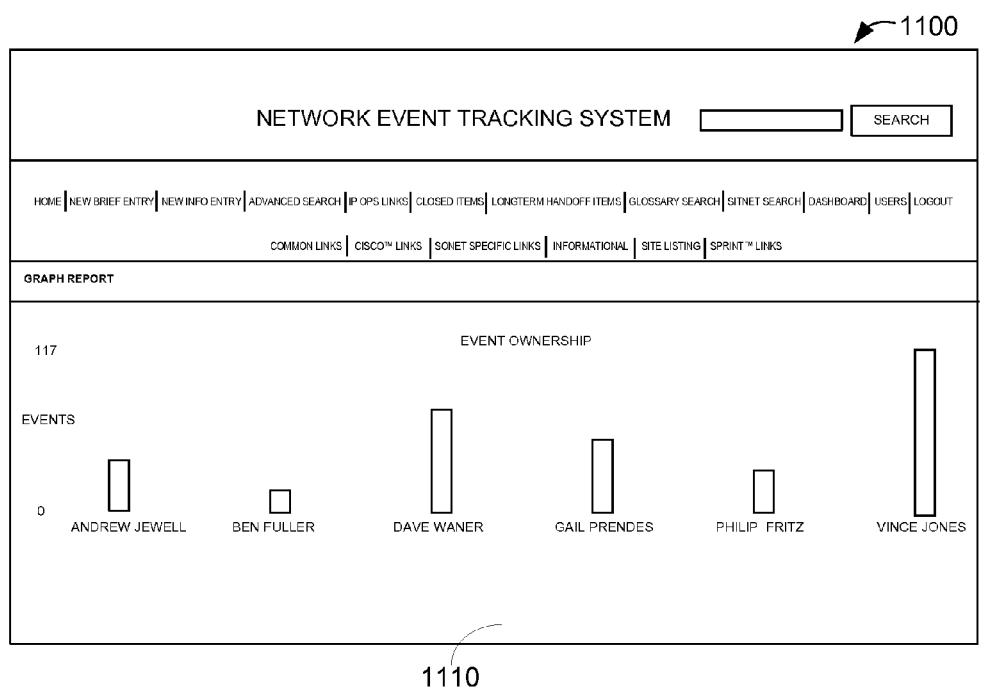
FIG. 11 is a user interface diagram illustrating an exemplary report interface for the network event tracking system, according to embodiments of the present invention.

FIG. 11 is a user interface diagram illustrating an exemplary report interface 1100 for the network event tracking system, according to embodiments of the present invention. The report interface 1100 may provide a graph 1110 that presents the results of a search on all network events stored in the database. The graph 1110 includes a total number of network events and graphical indicates a number of network events entered by each authorize client or technician. In another embodiments of the present invention, the graph may include data one the number cases being handled by a vendor, such as Cisco™ and the client or technician that entered the network event. In certain embodiments, the graph may provide the client or technician that is assigned to the network event. A graph provided by the report interface 1100 may graphically show any combination of the entries matching the advanced search criteria.

NETS may also provide reports associated with pre-defined queries that are executed at high frequency, weekly or daily. The reports associated with pre-defined queries access the network events stored in the database to generate network snapshots that are presented to the client or technician as a dashboard.

Figure 12:
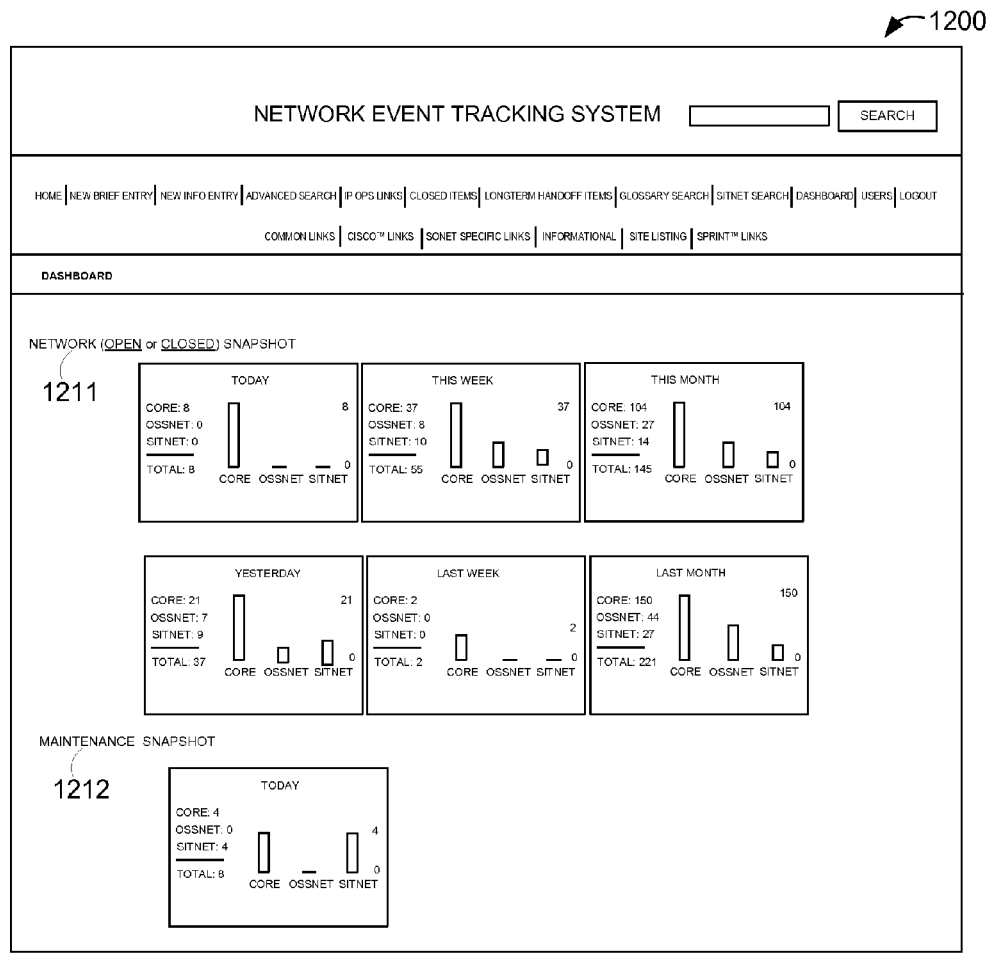
FIG. 12 is a user interface diagram illustrating an exemplary network and maintenance snapshot interface for the network event tracking system, according to embodiments of the present invention.

FIG. 12 is a user interface diagram illustrating an exemplary network and maintenance snapshot interface 1200 for the network event tracking system, according to embodiments of the present invention. The network and maintenance snapshot interface 1200 provide reports for the queries that are frequently presented to the network event database. In some embodiments, the network reports 1211 may provide a number associated with network events that are open or closed on each of the networks being monitored or maintained by NETS. Also, NETS may provide an indication of how the numbers associated with each network were changed during time frames such as a previous month, a previous week or a previous day. The client or technician may utilize these reports to detect trends on each of the networks. The maintenance report 1212 may provide a number associated with network events that are requires maintenance on each of the networks being monitored or maintained by NETS. Similar to the network report 1211, the maintenance report 1212 may provide an indication of how the numbers associated with each network change during different time frames.

NETS also provides a predefined information query that broadcasts important information or network events to a client. or technician. The information broadcast is presented to each authorized client or technician after login into the NET system.

FIG. 13 is a user interface diagram illustrating an exemplary user broadcast interface 1300 for the network event tracking system, according to embodiments of the present invention. The network event database may include an information broadcast table that stores the network event or information and the priority associated with the network event or information. The user broadcast interface 1300 displays the priority and the information or network events that are stored for broadcasting in the network event database.

In certain embodiment, NETS also provides predefined network queries that search for network events associated with each of the networks monitored or tracked by the network event or network events to a client. or technician. All network events for each network is presented to each authorized client or technician that is interested in the network events for each network. In an alternative embodiment, a subset of the networks events for each network that are assigned to a certain authorized client or technician is provided to the certain authorized client or technician.

FIG. 14 is a user interface diagram illustrating an exemplary network event interface 1400 for the network event tracking system, according to embodiments of the present invention. The network event interface 1400 may provide network event entries for each network. The network event interface 1400 may include links 1410, 1420, and 1430 that provide access to network event associated with each network monitored and maintained by NETS. The network event interface 1400 includes an display area that display all network events associated with a selected network 1440. Each network event display provides a severity, element name date entered, date updated, vendor case or Cisco™ case number, a maintenance number, and a description of the event. Each entry may be associated with a vendor shortcut 1451, such as Cisco™ case or maintenance shortcut 1452. NETS is configured to contact a vendor site, provide a vendor name or case number, and retrieve vendor data associated with the vendor name or case number via the vendor shortcut 1451. Similarly, NETS is configure to NETS is configured to contact a maintenance notification or management system, provide a maintenance number, and retrieve maintenance data associated with the maintenance number via the maintenance shortcut 1452.

Figure 15C:
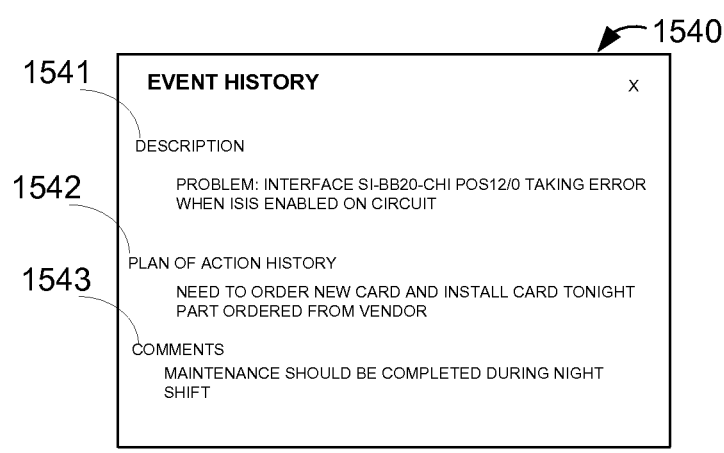
FIG. 15C is a user interface diagram illustrating an exemplary event history interface for the network event tracking system, according to embodiments of the present invention.

The network event interface 1400 may include user interface elements that update or access the entries associated with a network event. The user interface elements may include a new plan of action link 1460, an add comments link 1461, and a view history link 1462. Accordingly, the new plan of action link 1460, add comments link 1461, and view history link 1462 may be utilized to update an entry associated with the network event or provide a historical view of the network event. FIGS. 15A-15C further describe the interfaces associated with the new plan of action link 1460, add comments link 1461, and view history link 1462.

FIG. 15A is a user interface diagram illustrating an exemplary plan of action interface 1500 for the network event tracking system, according to embodiments of the present invention. The plan of action interface 1500 includes a plan of action textbox 1510 that receives a description of new actions that will be associated with the network event or network element. The description received by the new plan action interface 1510 is stored by the network event database as a additional plan of action record for the network event. The plan of action entries are logged by NETS to provide an log trail associated with the network event. That, is the prior plan of action record is stored in to addition to the new plan of action record in the network event database.

FIG. 15B is a user interface diagram illustrating an exemplary comment interface for the network event tracking system, according to embodiments of the present invention. The comment interface 1520 includes a comment textbox 1530 that receives a description of client or technician comments that will be associated with the network event or network element. The description received by the comment interface 1510 is stored by the network event database as a additional comment record for the network event. The plan of action entries are logged by NETS to provide an log trail associated with the network event. That, is the prior comment record is stored in to addition to the new comment record in the network event database.

FIG. 15C is a user interface diagram illustrating an exemplary event history interface 1540 for the network event tracking system, according to embodiments of the present invention. The event history interface 1540 provides a historical record that provides the plans of action and comments associated with each network problem. The event history interface 1540 includes a description of network event, each plan of action and each comment corresponding to the network event.

NETS provides a collection of utilities that are utilized by the client or technician when monitoring or maintain the networks. The collection of links may be classified according to functionality of the programs or resources included as a client or technician utility. FIGS. 16-20 provide user interfaces for utilities based on functionality.

Figure 16:
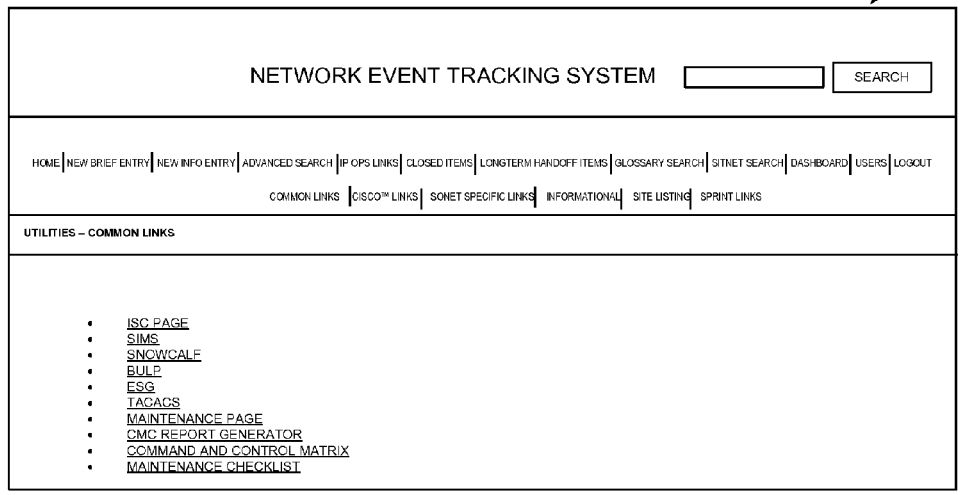
FIG. 16 is a user interface diagram illustrating an exemplary common links interface for the network event tracking system, according to embodiments of the present invention.

FIG. 16 is a user interface diagram illustrating an exemplary common links interface 1600 for the network event tracking system, according to embodiments of the present invention. The common links interface 1600 provides access to most recently used and frequently user links that are accessed by all authorized client or technicians in the network database.

Figure 17:
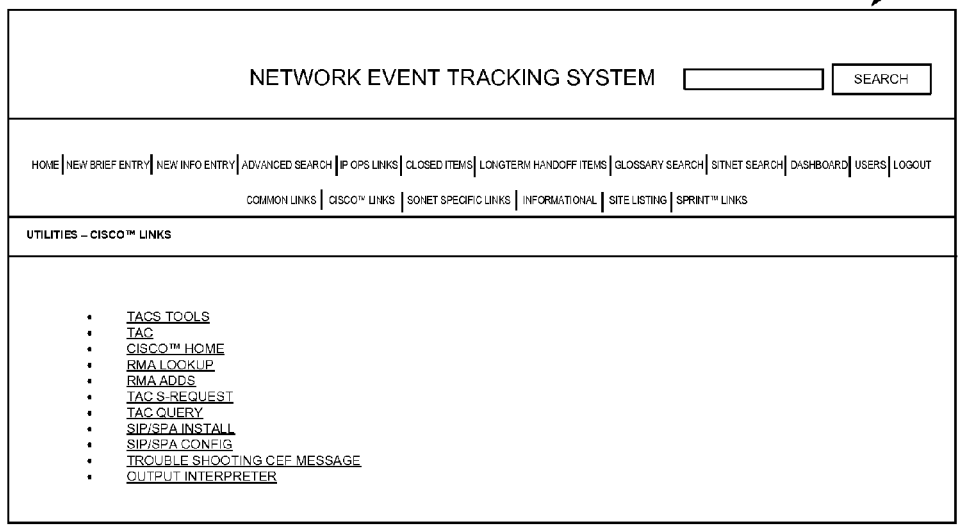
FIG. 17 is a user interface diagram illustrating an exemplary Cisco™ links interface for the network event tracking system, according to embodiments of the present invention.

A vendor that provides a large number of network elements in the monitored and maintained networks would have an interface that provide the most recently accessed and frequent user links to the client or technicians. FIG. 17 is a user interface diagram illustrating an exemplary Cisco™ links interface 1700 for the network event tracking system, according to embodiments of the present invention. The Cisco™ links interface 1700 provide vendor related information that are utilized by clients or technicians dealing with a vendor having a special relationship with client or technicians.

Figure 18:
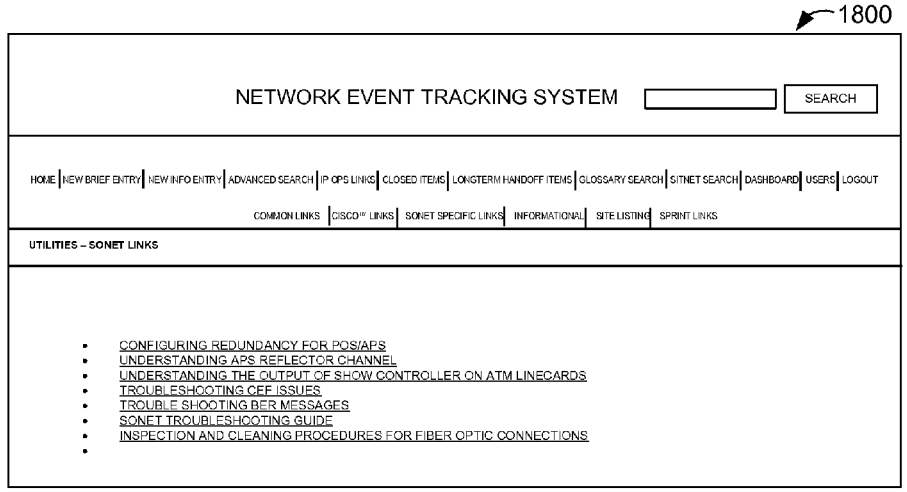
FIG. 18 is a user interface diagram illustrating an exemplary synchronous optical network (SONET) links interface for the network event tracking system, according to embodiments of the present invention.

NETS may provide standard-specific interfaces that list frequently accessed information or programs associated with a standard utilized by network elements. FIG. 18 is a user interface diagram illustrating an exemplary synchronous optical network (SONET) links interface 1800 for the network event tracking system, according to embodiments of the present invention. The synchronous optical network (SONET) links interface 1800 provides links that are useful to clients or technician dealing with network elements that implement a specific standard, such as SONET. In certain embodiments, the links include the most recently accessed and frequently accessed documents and programs associated with the a one or more standards utilized by NETS.

Figure 19:
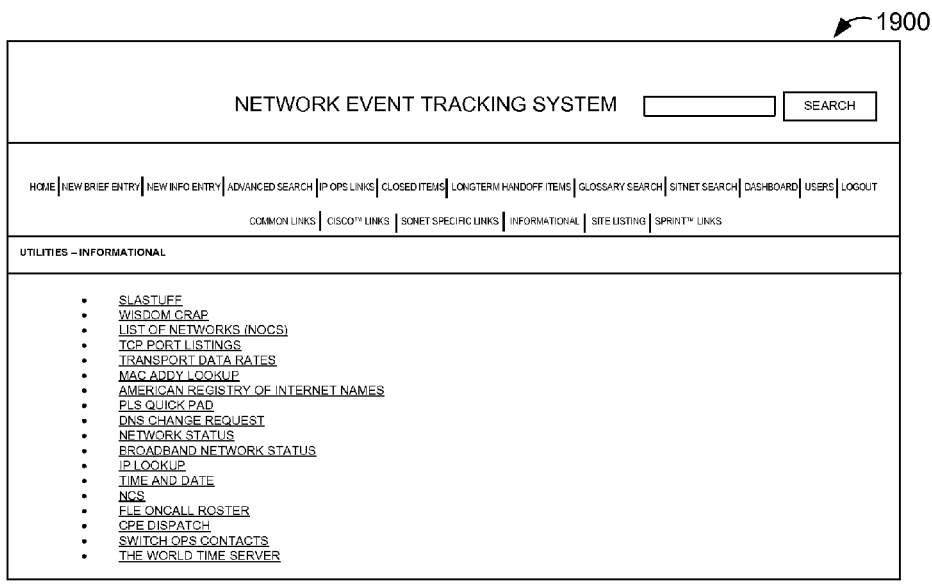
FIG. 19 is a user interface diagram illustrating an exemplary information interface for the network event tracking system, according to embodiments of the present invention.

FIG. 19 is a user interface diagram illustrating an exemplary information interface 1900 for the network event tracking system, according to embodiments of the present invention. The information interface 1900 provides access to general links that are utilized by the clients or technicians. The general links displayed on the information interface may include links that are most recently accessed or frequently used.

Figure 20:
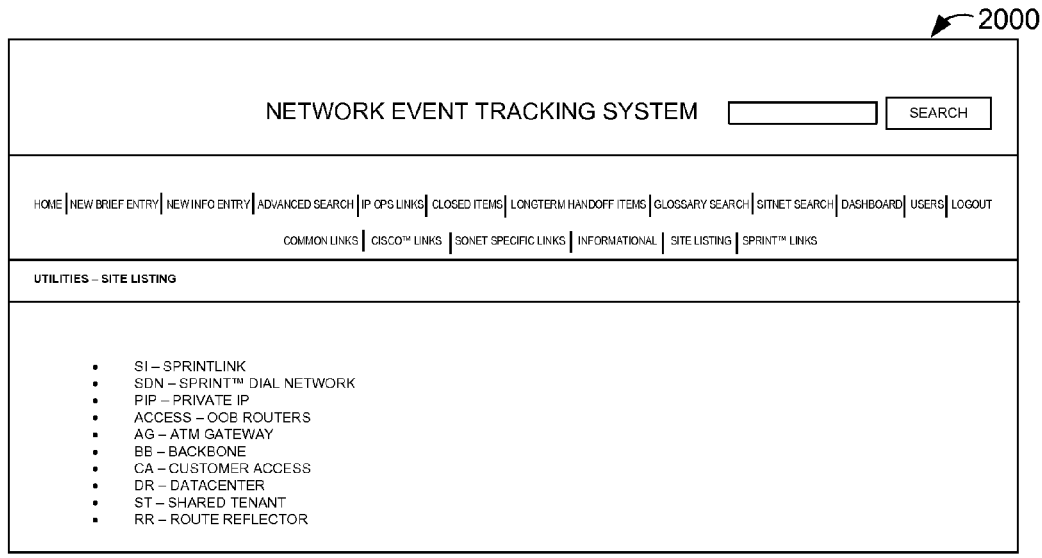
FIG. 20 is a user interface diagram illustrating an exemplary site listing interface for the network event tracking system, according to embodiments of the present invention.

FIG. 20 is a user interface diagram illustrating an exemplary site listing interface 2000 for the network event tracking system, according to embodiments of the present invention. The site listing interface 2000 provides a listing of the most recently accessed or frequently updated network site or network element in the network event database.

Figure 21:
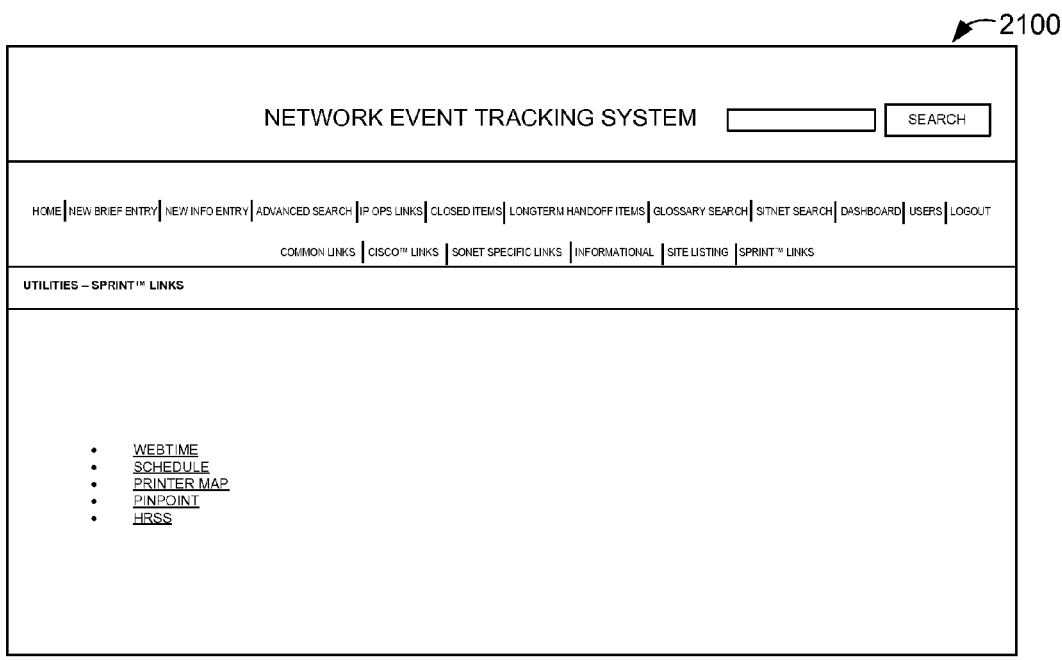
FIG. 21 is a user interface diagram illustrating an exemplary Sprint™ links interface for the network event tracking system, according to embodiments of the present invention.

FIG. 21 is a user interface diagram illustrating an exemplary Sprint™ links interface 2100 for the network event tracking system, according to embodiments of the present invention. The Sprint™ links interface 2100 provide links that most recently accessed or frequently accessed by the clients or technicians when performing internal network actions.

NETS utilizes the user interfaces to provide graphical reports the client or technician. NETS executes a method for tracking network events to update the network event database. In turn, the information stored in the network event database may be queried to generate reports on network health.

Figure 22:
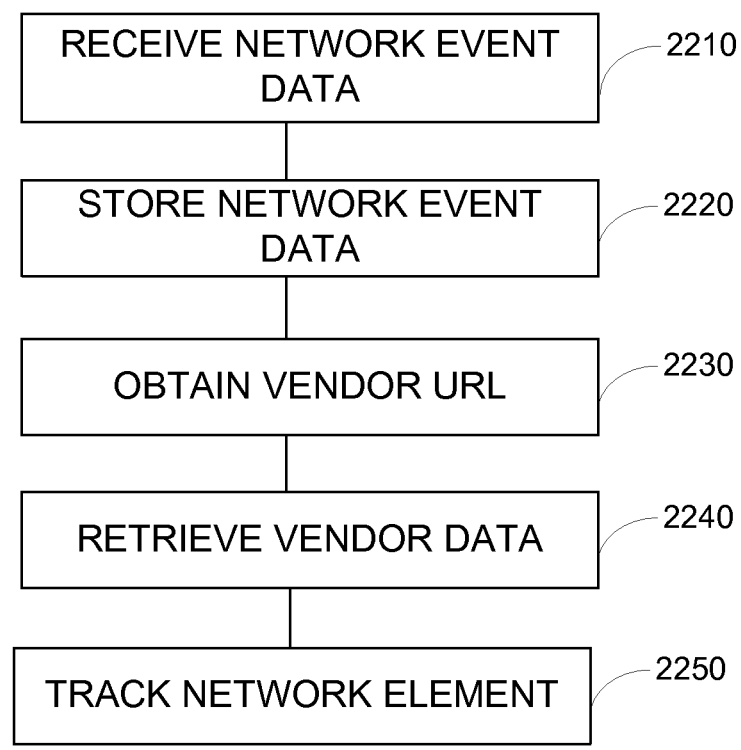
FIG. 22 is a flow diagram illustrating an exemplary method for tracking network events, according to embodiments of the present invention.

FIG. 22 is a flow diagram illustrating an exemplary method for tracking network events 2200, according to embodiments of the present invention. The method includes logging in as an authorized user of NETS and providing network event data, including network name and vendor name and vendor case number, for network elements from, in step 2210. NETS processes and stores the network event data in a network event database, in step 2220. In turn, NETS may obtain a vendor uniform resource locator (URL) associated with the vendor name and vendor case number associated with the network element from a look-up table or address translation service, in step 2230. The vendor URL is accessed to retrieve vendor element data corresponding to the network element in step 2240. NETS may utilize the vendor URL or vendor case number to track the network element or network event, in step 2250.

Figure 23:
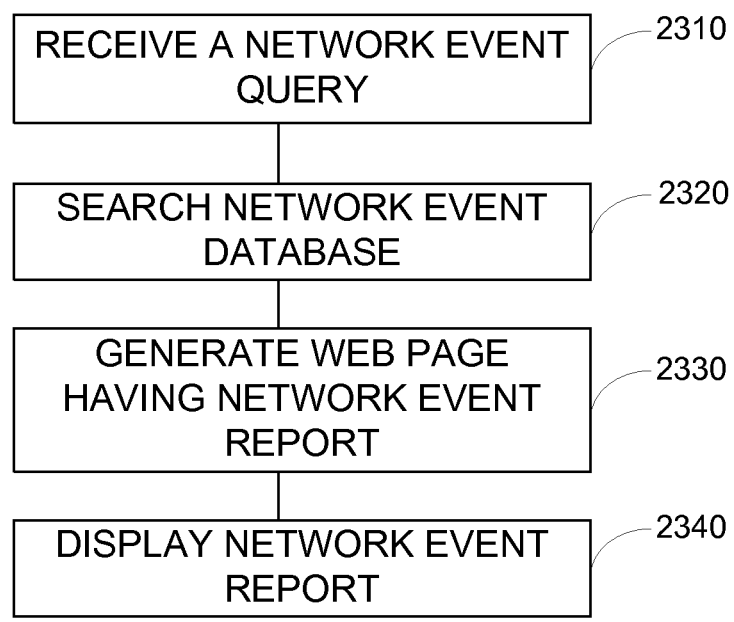
FIG. 23 is a flow diagram illustrating an exemplary method for generating network event reports, according to embodiments of the present invention.

FIG. 23 is a flow diagram illustrating an exemplary method for generating network event reports, according to embodiments of the present invention. The network event database receives queries that include network related data from an authorized client or technician of NETS, in step 2310. In some embodiments of the invention, the queries include pre-defined queries that are encapsulate queries that are frequently sent to the network event database by other client or technicians. In turn, the network event database is searched to locate entries that match the queries, in step 2320. NETS generate a user interface having a report that present the results to the client or technician and display the user interface, in steps 2330 and 2340.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method to generate network health snapshots, the method comprising:
   receiving queries for network event data;
   counting the frequency for the received queries;
   generating network health snapshots that include the network event data for the queries that are received at a high frequency, wherein the network health snapshots provide a graphical indication of a change in the number for network events; and
   providing the network health snapshots for display to a client that issues queries similar to the received high frequency queries.

2. The method of claim 1, wherein the network health snapshots are displayed in a graphical user interface.

3. The method of claim 1, wherein the network health snapshots provide a graphical indication of a number for network elements that require maintenance.

4. The method of claim 3, wherein the network health snapshots provide a graphical indication of a number for network events that are open or a number for network events that are closed on each of the networks having network elements that are monitored or maintained.

5. The method of claim 4, wherein the network health snapshots provide a graphical indication of a change in the number for network events that are open or a change in the number for network events that are closed.

6. The method of claim 1, wherein the network event data includes a severity that describes a number of customers impacted by a network event associated with the network event data.

7. The method of claim 1, wherein the network health snapshots are displayed in a web page.

8. The method of claim 1, wherein the network health snapshots provide an indication of how the number for network events that are open or the number for network events that are closed change during different time frames.

9. One or more non-transitory computer-readable media having computer-useable instructions embodied thereon for performing a method to generate network health snapshots, the method comprising:
   receiving queries for network event data;
   counting the frequency for the received queries;
   generating network health snapshots that include the network event data for the queries that are received at a high frequency, wherein the network health snapshots provide a graphical indication of a change in the number for network events; and
   providing the network health snapshots for display to a client that issues queries similar to the received high frequency queries.

10. The media of claim 9, wherein the network health snapshots are displayed in a graphical user interface.

11. The media of claim 9, wherein the network health snapshots provide a graphical indication of a number for network elements that require maintenance.

12. The media of claim 11, wherein the network health snapshots provide a graphical indication of a number for network events that are open or a number for network events that are closed on each of the networks having network elements that are monitored or maintained.

13. The media of claim 11, wherein the network health snapshots provide a graphical indication of a change in the number for network events that are open or a change in the number for network events that are closed.

14. The media of claim 9, wherein the network event data includes a severity that describes a number of customers impacted by a network event associated with the network event data.

15. The method of claim 9, wherein the network health snapshots are displayed in a web page.

16. The method of claim 9, wherein the network health snapshots provide an indication of how the number for network events that are open or the number for network events that are closed change during different time frames.

17. A network event tracking system, the system comprising:
    multiple communication networks having network elements;
    a network event database to receive queries for network events associated with the multiple communication networks and to count the frequency for the received queries; and
    a report generator component to generate reports that include the network events stored in the database and network health snapshots that include the network event data for the queries that are received at a high frequency, wherein the network health snapshots provide a graphical indication of a change in the number for network events such that the reports of the network health snapshots are provided for display to a client that issues queries similar to the received high frequency queries.

18. The system of claim 17, wherein the reports include an event history that includes comments associated with each network event stored in the database.

19. The system of claim 17, wherein the reports include network element data provided by a vendor of the network element.

20. The system of claim 17, wherein the network health snapshots provide a graphical indication of a number for network elements that require maintenance.

21. The system of claim 17, wherein the network health snapshots provide a graphical indication of a number for network events that are open or a number for network events that are closed on each of the communication networks having network elements that are monitored or maintained.

* * * * *